(12) United States Patent
Cho

(10) Patent No.: US 11,418,474 B2
(45) Date of Patent: Aug. 16, 2022

(54) METHOD AND APPARATUS FOR PROCESSING NOTIFICATION USING NOTIFICATION PRESET

(71) Applicant: LINE Plus Corporation, Seongnam-si (KR)

(72) Inventor: Hoyoung Cho, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 0 days.

(21) Appl. No.: 16/915,192

(22) Filed: Jun. 29, 2020

(65) Prior Publication Data
US 2021/0006529 A1   Jan. 7, 2021

(30) Foreign Application Priority Data
Jul. 1, 2019 (KR) .......................... 10-2019-0078937

(51) Int. Cl.
| | | |
|---|---|---|
| G06F 15/173 | (2006.01) | |
| H04L 51/224 | (2022.01) | |
| H04L 67/55 | (2022.01) | |
| H04L 41/0816 | (2022.01) | |
| H04L 41/0806 | (2022.01) | |
| H04W 48/16 | (2009.01) | |

(52) U.S. Cl.
CPC .......... *H04L 51/24* (2013.01); *H04L 41/0806* (2013.01); *H04L 41/0816* (2013.01); *H04L 67/26* (2013.01); *H04W 48/16* (2013.01)

(58) Field of Classification Search
CPC . H04L 51/24; H04L 41/0806; H04L 41/0816; H04L 67/26; H04W 48/16

USPC .................. 370/329; 709/206, 203, 217, 224
See application file for complete search history.

(56) References Cited

U.S. PATENT DOCUMENTS

| | | | | |
|---|---|---|---|---|
| 6,085,110 A | * | 7/2000 | Nilsson ................. | H04W 48/18 455/434 |
| 2005/0048953 A1 | * | 3/2005 | Ohara ..................... | H04L 43/50 455/412.1 |
| 2009/0271486 A1 | * | 10/2009 | Ligh .................... | G06F 3/04886 709/206 |
| 2013/0125142 A1 | * | 5/2013 | Parker ............... | H04M 1/72448 719/318 |

(Continued)

FOREIGN PATENT DOCUMENTS

KR   10-1893033 B1   8/2018

*Primary Examiner* — Kaylee J Huang
(74) *Attorney, Agent, or Firm* — Harness, Dickey & Pierce, P.L.C.

(57) ABSTRACT

Disclosed are methods and apparatuses for processing a notification using a notification preset. A notification processing method may include providing, by the at least one processor, a notification preset setting function for setting a notification preset, the notification preset including a preset condition and a preset result, creating, by the at least one processor, at least one notification preset instance through the notification preset setting function, monitoring, by the at least one processor, whether a condition meets one of the at least one notification preset instance, and dynamically changing, by the at least one processor, a notification setting of the computer apparatus from a first state to a second state in response to a result of the monitoring indicating that the condition meets a first notification preset instance, from among the at least one notification preset instance.

16 Claims, 10 Drawing Sheets

(56) References Cited

U.S. PATENT DOCUMENTS

| | | | | |
|---|---|---|---|---|
| 2014/0194095 A1* | 7/2014 | Wynne | ................... | H04W 4/12 |
| | | | | 455/411 |
| 2014/0258480 A1* | 9/2014 | Tungatkar | ............. | G06F 15/177 |
| | | | | 709/221 |
| 2015/0326823 A1* | 11/2015 | Oh | ........................ | H04N 7/147 |
| | | | | 348/14.07 |
| 2017/0366416 A1* | 12/2017 | Beecham | ................ | H04L 45/50 |
| 2018/0063061 A1* | 3/2018 | Tian | ........................ | H04L 67/22 |

* cited by examiner

METHOD AND APPARATUS FOR PROCESSING NOTIFICATION USING NOTIFICATION PRESET

CROSS-REFERENCE TO RELATED APPLICATIONS

This U.S. non-provisional application and claims the benefit of priority under 35 U.S.C. § 119 to Korean Patent Application No. 10-2019-0078937, filed Jul. 1, 2019, the entire contents of which are incorporated herein by reference in their entirety.

BACKGROUND

Technical Field

One or more example embodiments relate to methods, apparatuses, and/or non-transitory computer-readable record media for processing a notification using a notification preset.

Related Art

With the developments in information and communication technologies, types of electronic devices are being diversified. For example, portable electronic devices equipped with a mobile operating system (OS), such as smartphones and tablet computers, are being widely used. A variety of programs for executing functions essential for using a portable electronic device and various functions desired by a user may be installed on a mobile OS. Many mobile OSs provide a program notification (hereinafter, referred to as a notification) function, such that a specific program may forward desired information, for example, notification information to a user regardless of whether the specific program is executed. For example, in response to an occurrence of a desired event, for example, receiving a missed call, receiving a message or an email, software update, etc., of which the specific program desires to notify the user, the specific program may notify the user of an occurrence of a corresponding event using the notification function regardless of whether a corresponding program is executed. As functions of programs installed on a portable electronic device are diversified and types of such programs increase, the use of notification information using the notification function may further increase on the portable electronic device. As a result, each of programs is designed to create various types of notification information and to forward the created notification information to the user. An amount of notification information created by programs installed on a portable electronic device is on the increase and types of notification information are being diversified.

However, providing a large amount of notification information may cause the user to be under stress due to notifications. Accordingly, there are many various conventional arts to process a notification. For example, an application for an instant messaging service provides a function capable of setting whether to provide a notification and how to provide a notification for each chatroom.

Such conventional arts may not set a notification for each detailed and specific situation.

SUMMARY

Some example embodiments provide notification processing methods that may provide a notification preset setting function that enables a user to set a notification preset according to a situation, and may automatically change a notification setting based on at least one notification preset set through the notification preset setting function, computer apparatuses for performing such methods, and a non-transitory computer-readable record medium storing instructions that, when executed by a processor, cause the processor to perform such methods on the computer apparatus in conjunction with the computer apparatus.

According to an aspect of at least one example embodiment, a notification processing method of a computer apparatus including at least one processor includes providing, by the at least one processor, a notification preset setting function for setting a notification preset, the notification preset including a preset condition and a preset result, creating, by the at least one processor, at least one notification preset instance through the notification preset setting function, monitoring, by the at least one processor, whether a condition meets one of the at least one notification preset instance, and dynamically changing, by the at least one processor, a notification setting of the computer apparatus from a first state to a second state in response to a result of the monitoring indicating that the condition meets a first notification preset instance, from among the at least one notification preset instance.

The method may further include maintaining the second state in response to the condition changing not to meet the first notification preset instance after meeting the first notification preset instance.

The notification preset setting function may include a first preset condition setting function for receiving an input or a selection on a condition that the computer apparatus connects to or disconnects from an access network, and a second preset condition setting function for receiving an input or a selection on an identifier of the access network, and the creating may include creating the at least one notification preset instance including specific preset conditions, the specific preset conditions associated with either the first preset condition setting function or the second preset condition setting function.

The access network may include a wireless fidelity (WiFi) network, and the identifier may include a service set identifier (SSID) of the WiFi network.

The notification preset setting function may include a preset result setting function for receiving an input or a selection on one of a first result of turning on entire notifications, a second result of turning off the entire notifications, a third result of turning on one or more notifications for a selected application, service, or chatroom, and a fourth result of turning off the one or more notifications for the selected application, service, or chatroom, and the creating may include creating the at least one notification preset instance including a specific preset result, the specific preset result associated with the preset result setting function.

The notification preset setting function may include a function for receiving an input or a selection on a chatroom and a message, and the notification processing method may further include automatically sending the message through the chatroom for a second notification preset instance, from among the at least one notification preset instance, in response to the result of the monitoring indicating that the condition meets the second notification preset instance, from among the at least one notification preset instance.

According to an aspect of at least one example embodiment, there is provided a non-transitory computer-readable record medium storing instructions that, when executed by a processor, cause the processor to perform the aforementioned notification processing method on a computer apparatus in conjunction with the computer apparatus.

According to an aspect of at least one example embodiment, there is provided a computer apparatus including at least one processor configured to execute a computer-readable instruction. The at least one processor is configured to provide a notification preset setting function for setting a notification preset, the notification preset including a preset condition and a preset result, create at least one notification preset instance through the notification preset setting function, monitor whether a condition meets one of the at least one notification preset instance, and dynamically change a notification setting of the computer apparatus from a first state to a second state in response to a monitoring result indicating that the condition meets a first notification preset instance, from among the at least one notification preset instance.

According to some example embodiments, it is possible to reduce stress of a user caused by an undesired notification by providing a notification preset setting function that enables the user to set a notification preset according to a situation, and by automatically changing notification settings based on at least one notification preset set through the notification preset setting function.

Further areas of applicability will become apparent from the description provided herein. The description and specific examples in this summary are intended for purposes of illustration only and are not intended to limit the scope of the present disclosure.

DETAILED DESCRIPTION

Figure 1:
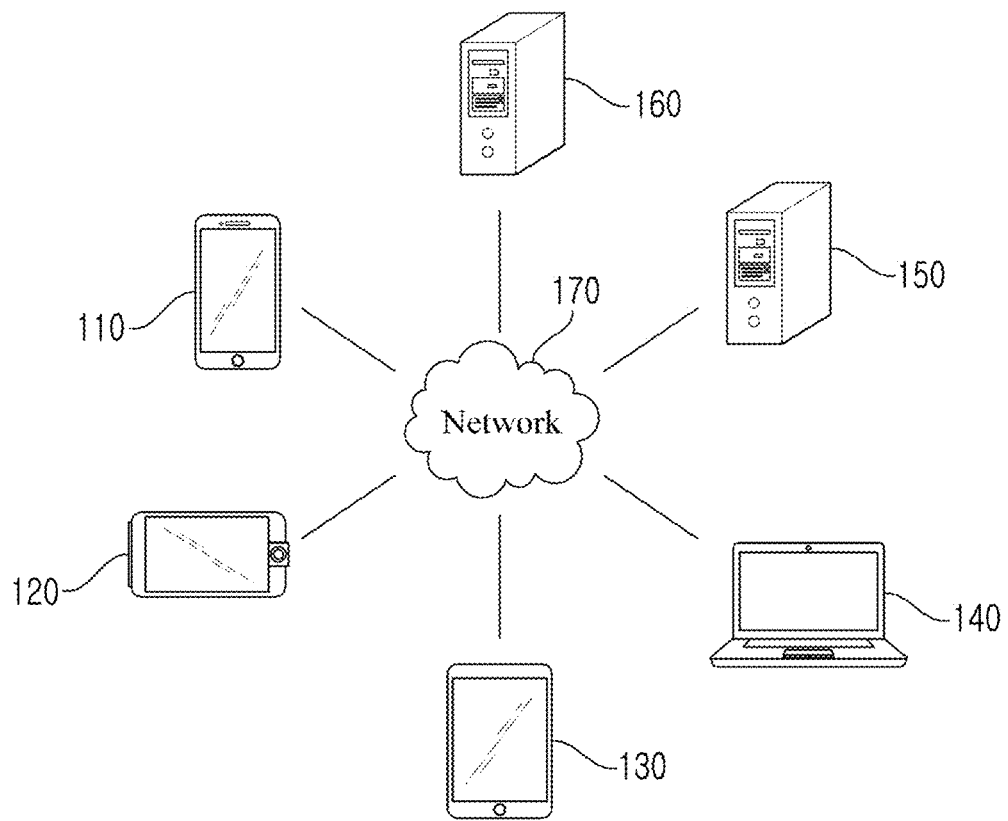
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A notification processing method according to example embodiments may be performed through at least one computer apparatus. Here, a computer program according to an example embodiment may be installed and executed on the computer apparatus and the computer apparatus may perform the notification processing method according to example embodiments. The computer program may be stored in a non-transitory computer-readable record medium to implement the notification processing method on a computer in conjunction with the computer apparatus.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as an example only among environments applicable to the example embodiments. An environment applicable to the example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (IAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. Here, the service may include, for example, a messaging service, a mail service, a social network service (SNS), a map service, a translation service, a financial service, a payment service, a search service, a content providing service, and a game service.

Figure 2:
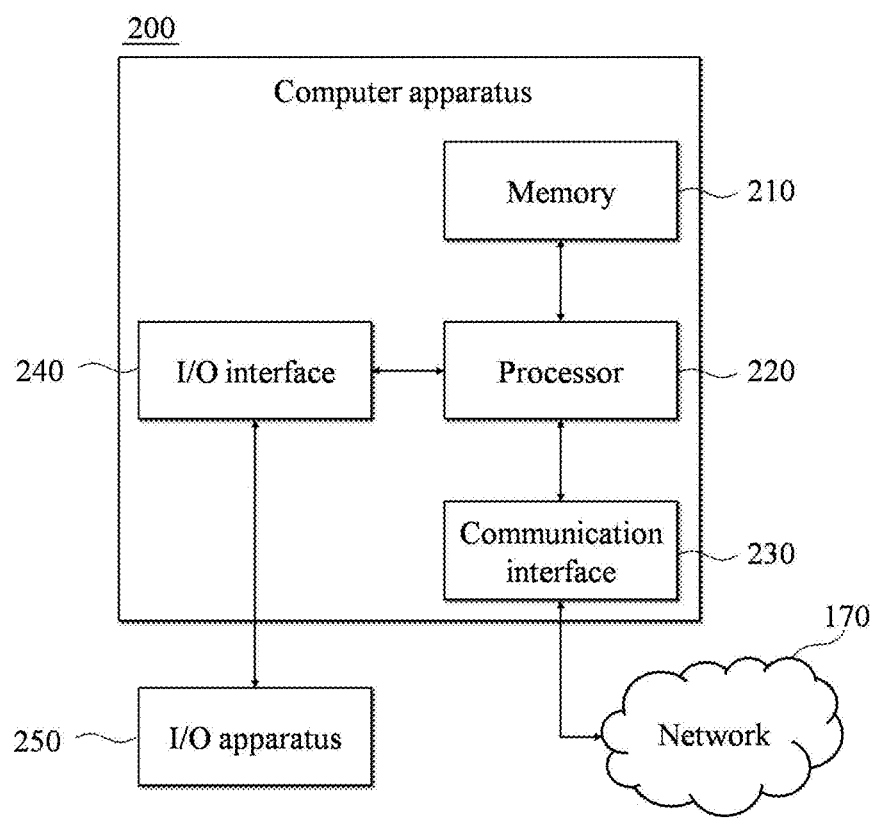
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and 140 or each of the servers 150 and 160 may be implemented by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as random access memory (RAM), a read only memory (ROM), and a disk drive, as a non-transitory computer-readable storage medium. The permanent mass storage device, such as ROM and disk drive, may be included in the computer apparatus 200 as a permanent storage device separate from the memory 210. Also, an OS and at least one program code may be stored in the memory 210. The software components may be loaded to the memory 210 from another non-transitory computer-readable medium separate from the memory 210. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 210 through the communication interface 230 instead of, or in addition to, the non-transitory computer-readable storage medium. For example, software components may be loaded to the memory 210 of the computer apparatus 200 based on a computer program installed by files received over the network 170.

The processor 220 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and another apparatus, for example, the aforementioned storage devices, over the network 170. For example, the processor 220 of the electronic apparatus 200 may transfer data, a file, a request or an instruction created based on the program code stored in the storage device, such as the memory 210, to other apparatuses over the network 170 under control of the communication interface 230. Inversely, a signal, an instruction, data, a file, etc., from the other apparatus may be received at the computer apparatus 200 through the communication interface 230 of the computer apparatus 200 by going through the network 170. For example, a signal, an instruction, data, etc., received through the communication interface 230 may be transferred to the processor 220 or the memory 210, and a file, etc., may be stored in a storage medium, for example, the permanent mass storage device, further includable in the computer apparatus 200.

The I/O interface 240 may be a device used for interface with an I/O apparatus 250. For example, an input device may include a device, such as a microphone, a keyboard, a mouse, and the like, and an output device may include a device, such as a display, a speaker, and the like. As another example, the I/O interface 240 may be a device for interface with an apparatus in which an input function and an output function are integrated into a single function, such as a touchscreen. The I/O apparatus 250 may be configured as a single apparatus with the computer apparatus 200.

According to other example embodiments, the computer apparatus 200 may include a number of components greater than or less than a number of components shown in FIG. 2. However, there is no need to clearly illustrate many components according to the related art. For example, the computer apparatus 200 may include at least a portion of the I/O apparatus 250, or may further include other components, for example, a transceiver, a database (DB), and the like.

Figure 3:
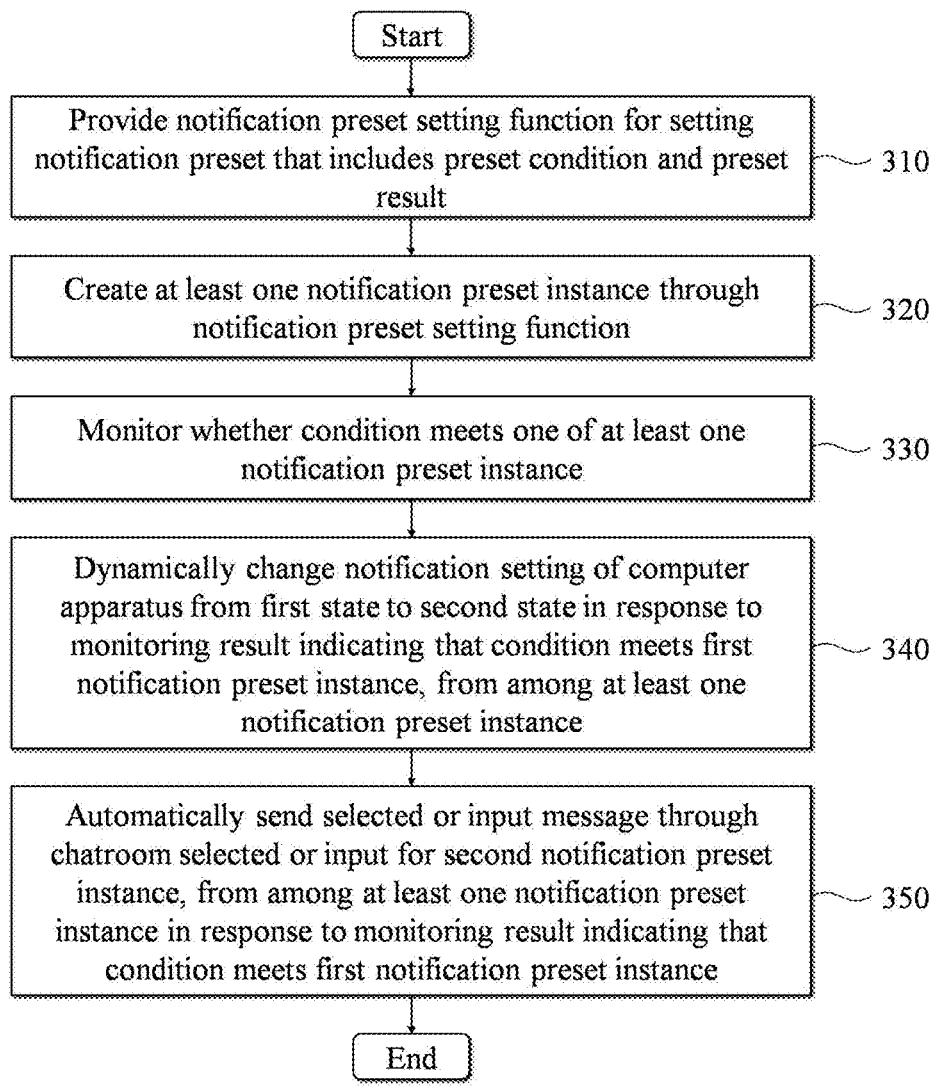
FIG. 3 is a flowchart illustrating an example of a notification processing method according to at least one example embodiment.

FIG. 3 is a flowchart illustrating an example of a notification processing method according to at least one example embodiment. The notification processing method of FIG. 3 may be performed by the computer apparatus 200 that configures a terminal of a user. For example, the processor 220 of the computer apparatus 200 may be configured to execute a control instruction according to a code of at least one computer program or a code of an OS included in the memory 210. Here, the processor 220 may control the computer apparatus 200 to perform operations 310 to 350 included in the notification providing method of FIG. 3 in response to a control instruction provided from a code stored in the computer apparatus 200.

Referring to FIG. 3, in operation 310, the computer apparatus 200 may provide a notification preset setting function for setting a notification preset that includes a condition (or alternatively, preset condition) and a result (or alternatively, a preset result). For example, the notification preset setting function may include a function for receiving an input or a selection on a condition and a function for receiving an input or a selection on a result.

In operation 320, the computer apparatus 200 may create at least one notification preset instance through the notification preset setting function. For example, in response to an input or a selection from the user on a condition and a result through the notification preset setting function, the notification preset instance that includes the input or selected condition and result may be created. A plurality of notification preset instances may be created. The created plurality of notification preset instances may be stored in a local storage of the computer apparatus 200.

In operation 330, the computer apparatus 200 may monitor whether a condition meets one of the at least one notification preset instance. In one example embodiment, the notification preset setting function may include a first condition setting function (or alternatively, first preset condition setting function) for receiving an input or a selection on a condition that the computer apparatus 200 connects to or disconnects from an access network and a second condition setting function (or alternatively, second preset condition setting function) for receiving an input or a selection on an identifier of the access network. For example, if the user creates a notification preset instance by selecting a condition for connecting to an access network and then inputting an identifier "AAA," the computer apparatus 200 may monitor whether the computer apparatus 200 connects to the access network identified by the identifier "AAA." As another example, if the user creates a notification preset instance by selecting a condition for disconnecting from an access network and inputting an identifier "BBB," the computer apparatus 200 may monitor whether to release the connection in a state in which the computer apparatus 200 is connected to the access network identified by the identifier "BBB." Here, the access network may include a wireless fidelity (WiFi) network and the identifier may include a service set identifier (SSID) of the WiFi network.

As described above, the computer apparatus 200 may monitor whether a condition of the notification preset instance is met. Here, the condition of the notification preset instance may be variously set depending on example embodiments. For example, although a specific access network is used as an example, it is provided as an example only. Various conditions or combinations of conditions may be used, such as, for example, a time, a location, a situation, and the like. For example, connection to an access network identified by an identifier "CCC" after 9 a.m. or between 9 a.m. to 6 p.m. may be set as a condition. Also, a specific control of the user for the computer apparatus 200 may be used as a condition.

In operation 340, if a condition of a first notification preset instance of the at least one notification preset instance is met, the computer apparatus 200 may dynamically change a notification setting of the computer apparatus 200 from a first state to a second state according to the monitoring result indicating that the condition meets the first notification preset instance, from among the at least one notification preset instance. In one example embodiment, the notification preset setting function may include a result setting function (or alternatively, preset result setting function) for receiving an input or a selection on one of a first result of turning on the entire notifications, a second result of turning off the entire notifications, a third result of turning on notifications for a selected application, service, or chatroom, and a fourth result of turning off notifications for a selected application, service, or chatroom. For example, the user may set a condition for a notification preset by selecting a condition for connecting to an access network and then inputting an identifier "AAA." Also, the user may create a notification preset instance 1 by selecting a result of turning off notifications for a chatroom and then designating a chatroom 1. In this case, the computer apparatus 200 may monitor whether the computer apparatus 200 connects to the access network identified by the identifier "AAA." If the computer apparatus 200 connects to the access the access network identified by the identifier "AAA," the computer apparatus 200 may turn off notifications for the chatroom 1.

Here, although the condition of the first notification preset instance is met and then changed to be unmet, the second state may be maintained. For example, in a state in which notifications for the chatroom 1 is turned off in response to connection of the computer apparatus 200 to the access network identified by the identifier "AAA," the computer apparatus 200 may disconnect from the access network identified by the identifier "AAA." Even in this case, notifications for the chatroom 1 may be still maintained to be in an off-state. If the user desires to turn on notifications for the chatroom 1 at a time of releasing a connection to the access network identified by the identifier "AAA," another notification preset instance may be created. For example, the user may create another notification preset instance including a condition for releasing a connection to the access network identified by the identifier "AAA" and a result of turning on notifications for the chatroom 1 using the notification preset setting function provided from the computer apparatus 200.

The computer apparatus 200 configured as above may be used in various situations. For example, a notification preset instance including a condition and a result of automatically turning off notifications for work related chatrooms in response to the user leaving an office and connecting to WiFi at home may be considered. As another example, a notification preset instance including a condition and a result of turning on notifications for work related chatrooms between 9 a.m. and 6 p.m. on weekdays may be considered. As another example, a notification preset instance including a condition and a result of turning on or off a notification based on position information may be considered. For example, a condition and a result of turning on or off a notification in response to a presence of the computer apparatus 200 in a specific place or region may be determined. Whether the computer apparatus 200 is present in the specific place or region may be determined based on position information of the computer apparatus 200 that is verified using coordinates of a global positioning system (GPS). The specific place or region may be set using, for example, GPS coordinates, address, and a specific position selected from the user on a map. As another example, a notification preset instance including a condition and a result of turning off notifications for all of chatrooms excluding specific chatrooms under control of the user may be considered.

Although examples of turning on or off notifications for a chatroom are described, an example of turning off or on notifications for a specific service or a specific application may be considered.

In operation 350, the computer apparatus 200 may automatically send the selected or input message through a chatroom selected or input for a second notification preset instance, from among the at least one notification preset instance, in response to the result of the monitoring indicating that the condition meets the second notification preset instance. For example, the notification preset setting function may include a function for receiving an input or a selection on a chatroom and a message. For example, in a case in which the user sets 9 a.m. on weekdays, and selects or inputs a chatroom 2 and a message "Went to work" as a condition, the computer apparatus 200 may send the message "Went to work" through the chatroom 2 at 9 a.m. every weekday. As described above, the computer apparatus 200 may be controlled to further perform a specific operation as a result in addition to setting a notification.

FIGS. 4 to 7 illustrate examples of a notification preset setting function according to at least one example embodiment.

Figure 4:
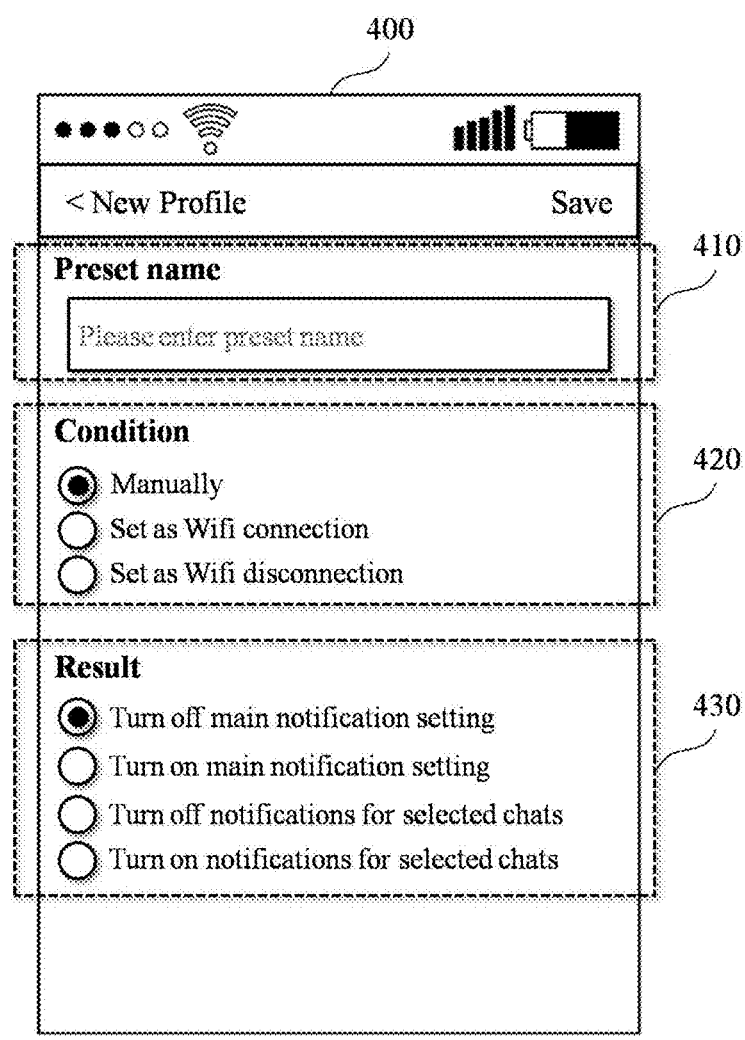
FIGS. 4 to 7 illustrate examples of a notification preset setting function according to at least one example embodiment.

Referring to a first screen 400 of FIG. 4 provided as an example of a notification preset setting function, a first box 410 indicated with dotted lines represents a function for setting a name of a notification preset instance, a second box 420 indicated with dotted lines represents a function for selecting a condition, and a third box 430 indicated with dotted lines represents a function for selecting a result. If settings of the first screen 400 are saved, a main notification setting may be turned off in response to a manipulation of the control.

Figure 5:
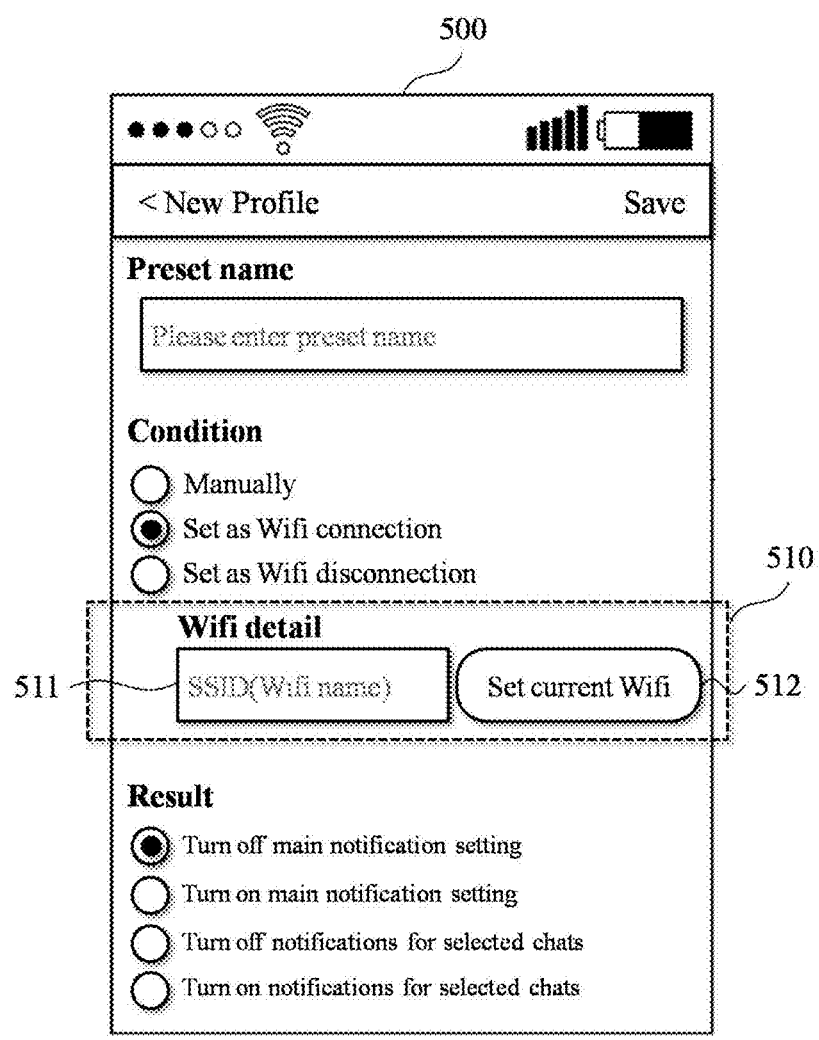

Referring to a second screen 500 of FIG. 5, a fourth box 510 indicated with dotted lines represents an example of displaying a function for selecting a specific access network in response to a selection from a user on "Set as WiFi connection" through a notification preset setting function. The user may input an identifier, for example, an SSID, for identifying a desired access network through an identifier input area 511 or may select an access network currently connected to by the computer apparatus 200 through a button "Set current WiFi" 512 displayed on the fourth box 510. Although the user selects "Set as WiFi disconnection," the function for selecting a specific access network may be provided as illustrated in the fourth box 510. Depending on example embodiments, a list of access networks recorded in the computer apparatus 200 may be initially provided and the user may select a desired access network from the list.

Figure 6:
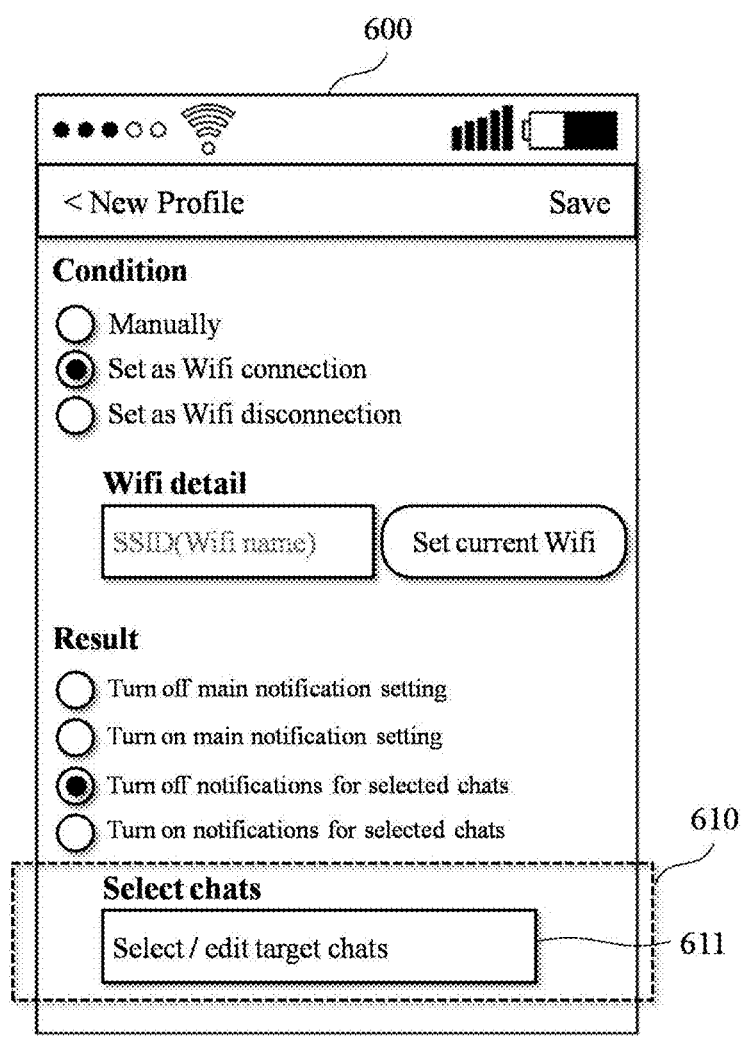

Referring to a third screen 600 of FIG. 6, a fifth box 610 indicated with dotted lines represents an example of displaying function for selecting a specific chatroom in response to a selection from a user on "Turn off notifications for selected chats" through a chatroom selected through a notification preset setting function. If the user selects a button "Select/edit target chats" 611 displayed on the fifth box 610, a list of chatrooms may be provided to the user and the user may select or unselect target chatrooms by individually selecting and unselecting chatrooms in the provided list.

Figure 7:
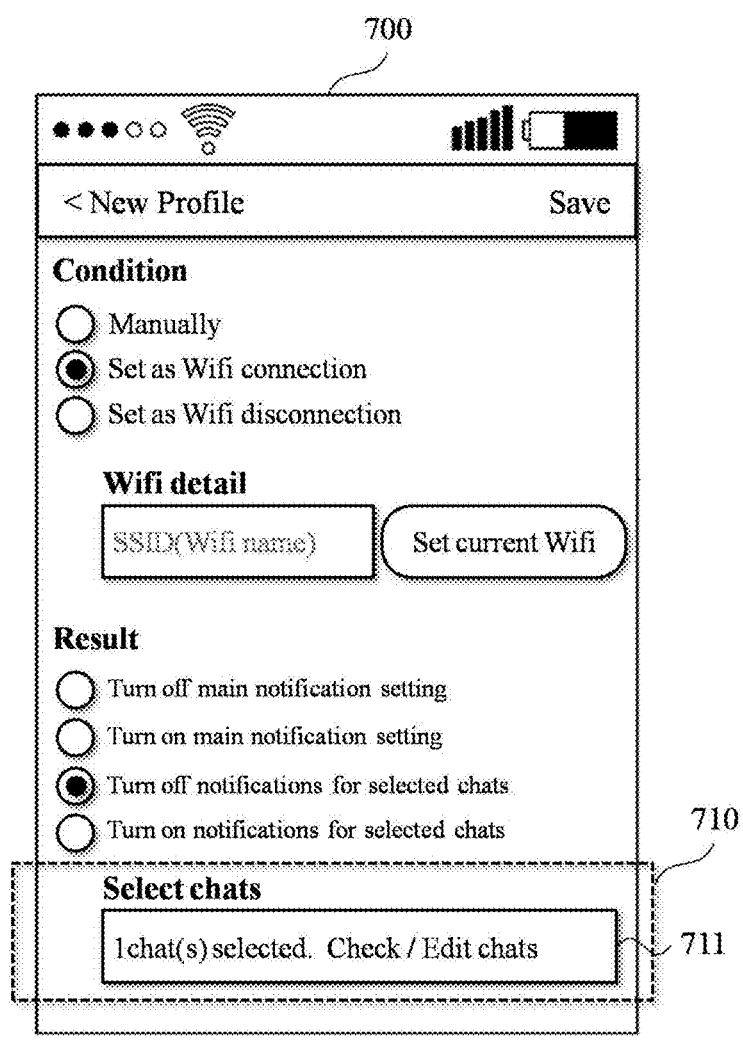

Referring to a fourth screen 700 of FIG. 7, in response to a selection from a user on at least one target chatroom, a number of selected chatrooms may be displayed. For example, a sixth box 710 indicated with dotted lines represents an example of displaying information representing that a single chatroom is selected on a button "Check/Edit chats" 711.

Figure 8:
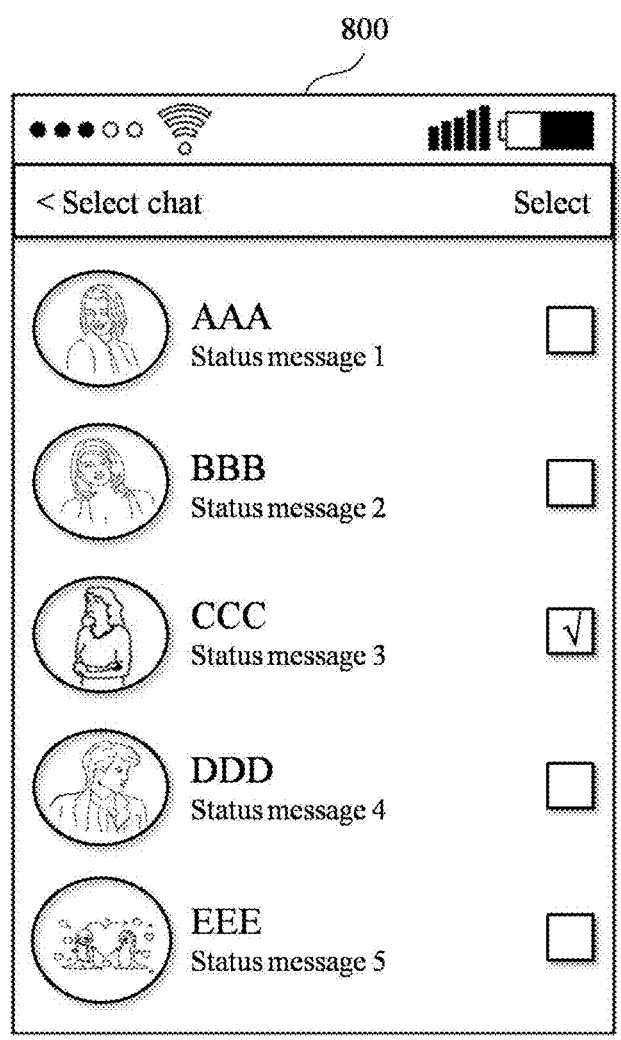
FIG. 8 illustrates an example of a function of selecting a target chatroom according to at least one example embodiment.

FIG. 8 illustrates an example of a function of selecting a target chatroom according to at least one example embodiment. Referring to a fifth screen 800 of FIG. 8, a list of chatrooms created in association with a user may be displayed. Here, the user may select or unselect a desired chatroom as a target chatroom.

Figure 9:
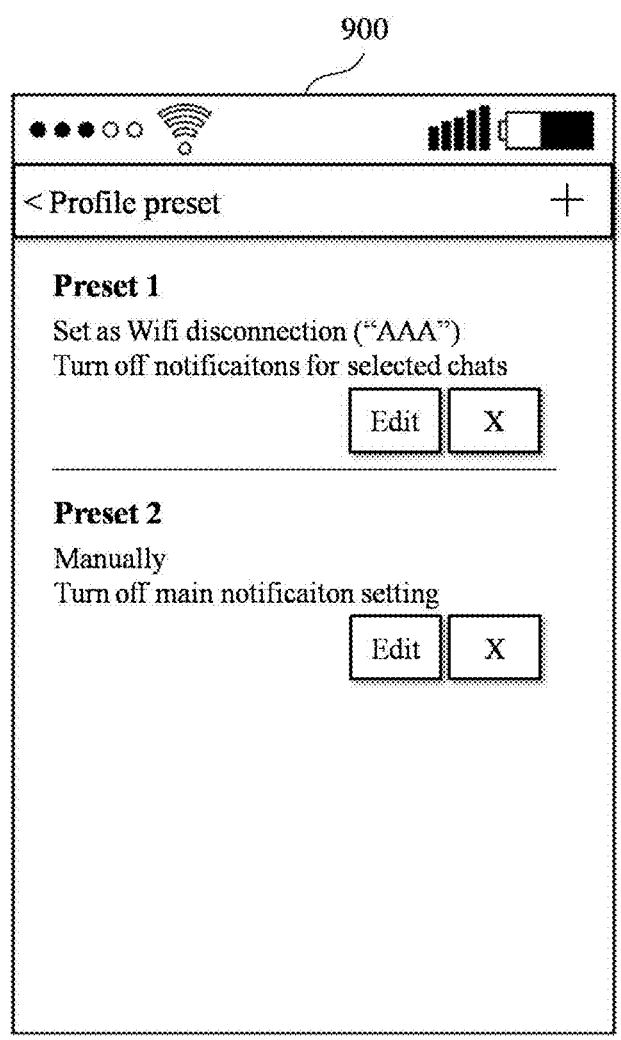
FIG. 9 illustrates an example of a list of notification presets according to at least one example embodiment.

FIG. 9 illustrates an example of a list of notification presets according to at least one example embodiment. Referring to a sixth screen 900 of FIG. 9, a list of notification presets created by a user may be displayed. The list may include a condition and a result set for each of the notification presets and may include a function for editing or deleting each of the notification presets.

Figure 10:
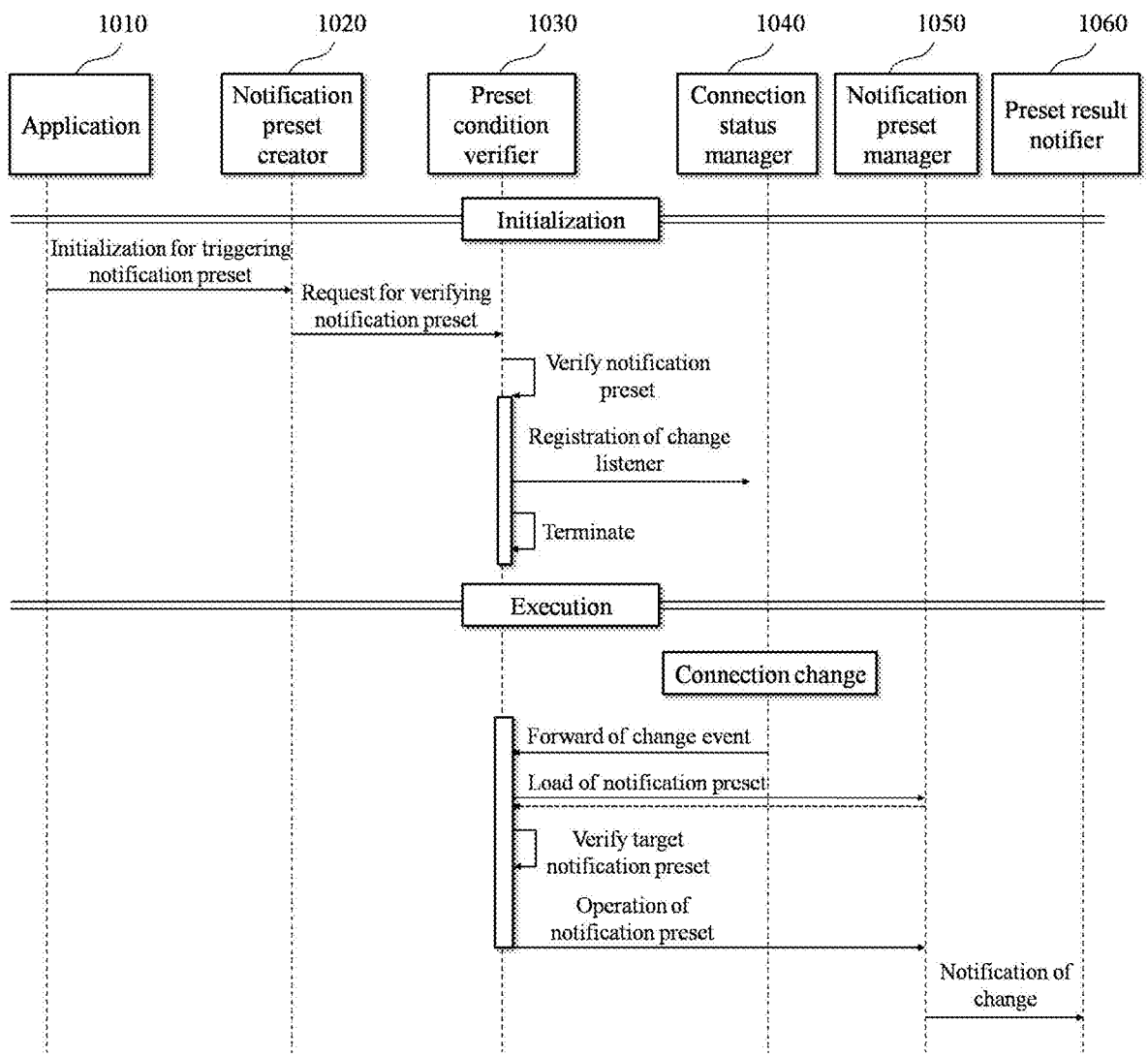
FIG. 10 illustrates an example of a notification processing process according to at least one example embodiment.

FIG. 10 illustrates an example of a notification processing process according to at least one example embodiment. An example embodiment relating to a notification processing process in the case of using a WiFi connection as a condition is described with reference to FIG. 10. Here, although it is described herein that an application 1010 installed and executed on the computer apparatus 200 performs the notification processing process, the application 1010 may be a code of a computer program that when executed by one or more processors included in the computer apparatus 200, controls the computer apparatus 200 to perform the notification processing process. Also, a notification preset creator 1020, a preset condition verifier 1030, a connection status manager 1040, a notification preset manager 1050, and a preset result notifier 1060 may be modules included in the application 1010.

The notification processing process according to the example embodiment may include an initialization process and an execution process.

During the initialization process, the application 1010 may perform an initialization for triggering a notification preset. For example, if a new notification preset instance is created, the application 1010 may perform the initialization process for the created notification preset instance. Here, the notification preset creator 1020 may request the preset condition verifier 1030 to verify a notification preset. In this case, the preset condition verifier 1030 may initially verify the notification preset. For example, the new notification preset instance may include a condition related to connection to specific WiFi. If an existing notification preset instance including a condition related to the same WiFi connection is present, a collision between the new notification preset instance and the existing notification preset instance may occur. Therefore, the preset condition verifier 1030 may initially verify the existing notification preset instances and may verify whether a notification preset instance including a condition related to the same WiFi connection as that of the new notification preset instance is present. If the existing notification preset instance including the condition related to the same WiFi connection is absent, the preset condition verifier 1030 may register a change listener to the connection status manager 1040. The connection status manager 1040 may manage a WiFi connection status of the computer apparatus 200 and may monitor a specific WiFi connection related to the condition included in the new notification preset instance through the change listener. Once the change listener is registered, the initialization process may be terminated.

During the execution process, the connection status manager 1040 may manage a WiFi connection status related to each of notification preset instances through registered change listeners. Here, in response to a change in a WiFi connection status of the computer apparatus 200, the connection status manager 1040 may forward a change event to the preset condition verifier 1030. In this case, the preset condition verifier 1030 may load a notification preset through the notification preset manager 1050 to verify a notification preset instance according to the change event. The preset condition verifier 1030 may verify a target notification preset corresponding to the change event among loaded notification preset instances. Once the target notification preset is verified, the preset condition verifier 1030 may call an operation of a notification preset managed by the notification preset manager 1050 and the notification preset manager 1050 may request the preset result notifier 1060 for change of a notification. A result of a corresponding notification preset instance may be processed through the preset result notifier 1060.

According to some example embodiments, it is possible to reduce undesirable consumption of resources of the systems or apparatuses for issuing an undesirable notification and/or performing actions corresponding to the undesirable notification, and thus reduce stress of a user caused by an undesired notification, by providing a notification preset setting function that enables the user to set a notification preset according to a situation, and by automatically changing notification settings based on at least one notification preset set through the notification preset setting function.

The systems or apparatuses described above may be implemented using hardware components, software components, and/or a combination thereof. For example, the apparatuses and the components described herein (e.g., the processor 220 and the communication interface 230 as illustrated in FIG. 2) may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed by Appstore that distributes applications or a site, a server, and the like that supplies and distributes other various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A non-transitory computer-readable record medium storing instructions that, when executed by a processor, cause the processor to implement a notification processing method on a computer apparatus in conjunction with the computer apparatus, the notification processing method comprising:

providing a notification preset setting function for setting a notification preset, the notification preset including a preset condition and a preset result, the preset condition including at least a first preset condition, the first preset condition being a connection condition including a first option indicating that the computer apparatus is connected to an access network and a second option indicating that the computer apparatus is disconnected from the access network;

creating at least one notification preset instance through the notification preset setting function;

monitoring whether a condition meets one of the at least one notification preset instance; and dynamically changing a notification setting of the computer apparatus from a first state to a second state in responses to a result of the monitoring indicating that the condition meets a first notification preset instance, from among the at least one notification preset instance, wherein the providing includes providing a graphical user interface configured to allow a user to select the preset condition and the preset result, and the graphical user interface is further configured to set a second condition of the preset condition, the second condition being set by an input or a selection on an identifier of the access network in response to the first option being selected as the first preset condition.

2. The non-transitory computer-readable record medium of claim 1, wherein the method further comprises maintaining the second state in response to the condition changing not to meet the first notification preset instance after meeting the first notification preset instance.

3. The non-transitory computer-readable record medium of claim 1, wherein the notification preset setting function includes a first preset condition setting function and a second preset condition setting function, the first preset condition setting function configured to receive an input or a selection on the connection condition as to whether the computer apparatus is connected to or is disconnected from the access network and set the first preset condition, and the second preset condition setting function configured to receive the input or the selection on the identifier of the access network and set a second preset condition, and the creating comprises creating the at least one notification preset instance including specific preset conditions, the specific preset conditions associated with either the first preset condition setting function or the second preset condition setting function.

4. The non-transitory computer-readable record medium of claim 3, wherein the access network includes a wireless fidelity (WiFi) network, and the identifier includes a service set identifier (SSID) of the WiFi network.

5. The non-transitory computer-readable record medium of claim 1, wherein the notification preset setting function includes a preset result setting function for receiving an input or a selection on one of a first result of turning on entire notifications, a second result of turning off the entire notifications, a third result of turning on one or more notifications, from among the entire notifications, for a selected application, service, or chatroom, and a fourth result of turning off the one or more notifications for the selected application, service, or chatroom, and the creating comprises creating the at least one notification preset instance including a specific preset result, the specific preset result associated with the preset result setting function.

6. The non-transitory computer-readable record medium of claim 1, wherein the notification preset setting function includes a function for receiving an input or a selection on a chatroom and a message, and the notification processing method further includes automatically sending the message through the chatroom for a second notification preset instance, from among the at least one notification preset instance, in response to the result of the monitoring indicating that the condition meets the second notification preset instance.

7. The non-transitory computer-readable record medium of claim 1, wherein the providing includes providing the graphical user interface configured to allow the user to turn off notifications for a specific chatroom in response to the user selecting a notification turn-off option as the preset result.

8. A notification processing method of a computer apparatus comprising at least one processor, the method comprising:

providing, by the at least one processor, a notification preset setting function for setting a notification preset, the notification preset including a preset condition and a preset result, the preset condition including at least a first preset condition, the first preset condition being a connection condition including a first option indicating the computer apparatus is connected to an access network and a second option indicating that the computer apparatus is disconnected from the access network;

creating, by the at least one processor, at least one notification preset instance through the notification preset setting function;

monitoring, by the at least one processor, whether a condition meets one of the at least one notification preset instance; and dynamically changing, by the at least one processor, a notification setting of the computer apparatus from a first state to a second state in response to a result of the monitoring indicating that the condition meets a first notification preset instance, from among the at least one notification preset instance, wherein the providing includes providing a graphical user interface configured to,
  allow a user to select the preset condition and the preset result, and
  set a second condition of the preset condition, and
the notification processing method further comprises,
  setting, by using the graphical user interface, the second condition by an input or a selection on an identifier of the access network, in response to the first option being selected as the first preset condition.

9. The notification processing method of claim 8, further comprising:

maintaining the second state in response to the condition changing not to meet the first notification preset instance after meeting the first notification preset instance.

10. The notification processing method of claim 8, wherein the notification preset setting function includes a first preset condition setting function and a second preset condition setting function, the first preset condition setting function configured to receive an input or a selection on the connection condition as to whether the computer apparatus is connected to or is disconnected from the access network and set the first preset condition, and the second preset condition setting function configured to receive the input or the selection on the identifier of the access network and set a second preset condition, and the creating comprises creating the at least one notification preset instance including specific preset conditions, the specific preset conditions associated with either the first preset condition setting function or the second preset condition setting function.

11. The notification processing method of claim 8, wherein the notification preset setting function includes a preset result setting function for receiving an input or a selection on one of a first result of turning on entire notifications, a second result of turning off the entire notifications, a third result of turning on one or more notifications for a selected application, service, or chatroom, and a fourth result of turning off the one or more notifications for the selected application, service, or chatroom, and the creating comprises creating the at least one notification preset instance including a specific preset result, the specific preset result associated with the preset result setting function.

12. The notification processing method of claim 8, wherein the notification preset setting function includes a function for receiving an input or a selection on a chatroom and a message, and the notification processing method further includes automatically sending the message through the chatroom for a second notification preset instance, from among the at least one notification preset instance, in response to the result of the monitoring indicating that the condition meets the second notification preset instance, from among the at least one notification preset instance.

13. The notification processing method of claim 8, wherein the providing includes providing the graphical user interface configured to allow the user to turn off notifications for a specific chatroom in response to the user selecting a notification turn-off option as the preset result.

14. A computer apparatus comprising:

at least one processor configured to execute a computer-readable instruction, wherein the at least one processor is configured to, provide a notification preset setting function for setting a notification preset, the notification preset including a preset condition and a preset result, the preset condition including at least a first preset condition, the first preset condition being a connection condition including a first option indicating that the computer apparatus is connected to an access network and a second option indicating that the computer apparatus is disconnected from the access network, create at least one notification preset instance through the notification preset setting function, monitor whether a condition meets one of the at least one notification preset instance, and dynamically change a notification setting of the computer apparatus from a first state to a second state in response to a monitoring result indicating that the condition meets a first notification preset instance, from among the at least one notification preset instance, and wherein the at least one processor is further configured to provide the notification preset setting function by providing a graphical user interface configured to, allow a user to select the preset condition and the preset result, and set a second condition of the preset condition by an input or a selection on an identifier of the access network, in response to the first option being selected as the first preset condition.

15. The computer apparatus of claim 14, wherein the at least one processor is further configured to maintain the second state in response to the condition changing not to meet the first notification preset instance after meeting the first notification preset instance.

16. The computer apparatus of claim 14, wherein the at least one processor is configured to provide the notification preset setting function by providing the graphical user interface configured to allow the user to turn off notifications for a specific chatroom in response to the user selecting a notification turn-off option as the preset result.

* * * * *